United States Patent
Kim et al.

(10) Patent No.: US 8,976,311 B2
(45) Date of Patent: Mar. 10, 2015

(54) BACKLIGHT UNIT AND LIQUID CRYSTAL DISPLAY DEVICE HAVING THE SAME

(75) Inventors: Min Joo Kim, Seoul (KR); Dong Hyeok Kim, Namyul-ri (KR); Jin Ryun Kim, Seoul (KR)

(73) Assignee: LG Display Co. Ltd., Seoul (KR)

( * ) Notice: Subject to any disclaimer, the term of this patent is extended or adjusted under 35 U.S.C. 154(b) by 287 days.

(21) Appl. No.: 12/639,639

(22) Filed: Dec. 16, 2009

(65) Prior Publication Data

US 2010/0309406 A1 Dec. 9, 2010

(30) Foreign Application Priority Data

Jun. 9, 2009 (KR) .................. 10-2009-0051178

(51) Int. Cl.
*G02F 1/1333* (2006.01)
*G02F 1/1335* (2006.01)
*G02B 3/00* (2006.01)
*G02B 5/04* (2006.01)

(52) U.S. Cl.
CPC .............. *G02B 3/0006* (2013.01); *G02B 5/045* (2013.01); *G02F 1/133606* (2013.01); *G02F 2001/133607* (2013.01)
USPC ................... 349/57; 349/58; 349/61; 349/62; 349/63; 349/64

(58) Field of Classification Search
USPC .......................................... 349/61–71, 95, 58
See application file for complete search history.

(56) References Cited

U.S. PATENT DOCUMENTS

| 6,364,497 | B1* | 4/2002 | Park et al. | 362/627 |
| 7,160,016 | B2* | 1/2007 | Yu et al. | 362/620 |
| 7,530,720 | B2* | 5/2009 | Shimura | 362/606 |
| 2005/0219440 | A1* | 10/2005 | Kim | 349/62 |
| 2005/0276071 | A1* | 12/2005 | Sasagawa et al. | 362/607 |
| 2007/0159699 | A1* | 7/2007 | Wang et al. | 359/599 |
| 2007/0183149 | A1* | 8/2007 | Ko et al. | 362/225 |
| 2007/0242199 | A1* | 10/2007 | Harada | 349/117 |
| 2009/0161345 | A1* | 6/2009 | Hsu et al. | 362/97.2 |
| 2009/0316274 | A1* | 12/2009 | Lee et al. | 359/634 |

FOREIGN PATENT DOCUMENTS

| CN | 101191853 A | 6/2008 |
| CN | 101196583 A | 6/2008 |
| KR | 1020080086700 A | 9/2008 |
| KR | 1020090019301 A | 2/2009 |
| KR | 1020090053636 A | 5/2009 |

OTHER PUBLICATIONS

Office Action issued in corresponding Chinese Patent Application No. 200910258499.5, mailed Feb. 23, 2012.

(Continued)

*Primary Examiner* — Hoan C Nguyen
(74) *Attorney, Agent, or Firm* — Brinks Gilson & Lione (57) ABSTRACT

A backlight unit adapted to implement enhanced light efficiency and uniform brightness is disclosed. The backlight unit includes a plurality of light sources arranged at fixed intervals, a diffusion plate disposed on the plurality of light sources, prism patterns formed on one surface of the diffusion plate, and micro-lens patterns formed on the other surface of the diffusion plate. The vertex angle of each prism pattern is in a range of about 64°~76°.

3 Claims, 6 Drawing Sheets

(56) References Cited

OTHER PUBLICATIONS

Office Action issued in corresponding Korean Patent Application No. 10-2009-0051178, mailed Feb. 25, 2013.

Office Action issued in corresponding Korean Patent Application No. 10-2009-0051178, mailed May 29, 2013, 3 pages.

* cited by examiner

BACKLIGHT UNIT AND LIQUID CRYSTAL DISPLAY DEVICE HAVING THE SAME

This application claims the benefit of Korea Patent Application No. 10-2009-0051178, filed on Jun. 9, 2009, the entire contents of which is incorporated herein by reference for all purposes as if fully set forth herein.

BACKGROUND

1. Field of the Invention

This disclosure relates to a backlight unit, and more particularly to a backlight unit adapted to implement enhanced light efficiency and uniform brightness, and a liquid crystal display device having the same.

2. Discussion of the Related Art

Liquid crystal display (LCD) devices are widening their application fields as a result of their features, such as their light weight, slimness, low driving voltage, and so on. This trend is evident in the ways in which the LCD devices have been applied to office automation equipment, audio equipment, video equipment, and more. The LCD device controls a transmitting amount of light on the basis of image signals applied to a plurality of control switches, in order to display a picture.

The LCD device, which is not self-luminescent, includes a backlight unit irradiating light on the rear surface of an LCD panel in which a picture is displayed. The backlight unit is classified as either an edge type or a direct type in accordance with the disposition of its light source.

The edge type backlight unit includes a light source which is disposed in a position corresponding to a side of the LCD panel. Also, the edge type backlight unit irradiates light emitted from the light source onto the entire surface of the LCD panel using a light guide panel. On the other hand, the direct type backlight unit includes a plurality of light sources arranged opposite the rear surface of the LCD panel. These plural light sources directly apply light to the rear surface of the LCD panel. The direct type backlight unit has a higher brightness and a wider luminescent surface than the edge type backlight unit because it employs a plurality of light sources. In addition, the backlight unit becomes larger in size corresponding to the increased size of the LCD device. In view of these points, direct type backlight units are widely used in LCD devices.

Such a direct type backlight unit generates a difference in brightness between the regions that include a light source and those that do not. This results from the configuration in which plural light sources are arranged at fixed intervals on the rear surface of the LCD panel. In other words, it is difficult for the direct type backlight unit to implement uniform brightness.

To address this problem, a direct type backlight unit of the related art included in an LCD device increases the distance between the light sources and a diffusion plate disposed above the light sources. The direct type backlight unit of the related art can realize uniform brightness, though it decreases brightness and prevents slimness of the LCD device.

Alternatively, another direct type backlight unit of the related art is configured to employ a diffusion plate including diffusion beads, in order to realize both uniform brightness and slimness of the LCD device. The diffusion plate including diffusion beads largely increases the costs the LCD device. Also, the diffusion plate including the beads causes the transmission and reflection of light to be repeated due to a refractive index difference. Accordingly, brightness in the front direction is deteriorated.

BRIEF SUMMARY

According to one general aspect of the present embodiment, a backlight unit includes: a plurality of light sources arranged at fixed intervals; a diffusion plate disposed on the plurality of light sources; prism patterns formed on one surface of the diffusion plate; and micro-lens patterns formed on the other surface of the diffusion plate, wherein the vertex angle of each prism pattern is in a range of about 64°~76°.

An LCD device according to another aspect of the present embodiment includes: a liquid crystal display panel; a plurality of light sources arranged at fixed intervals under the liquid crystal display panel; a diffusion plate disposed on the plurality of light sources; prism patterns formed on one surface of the diffusion plate; and micro-lens patterns formed on the other surface of the diffusion plate, wherein the vertex angle of each prism pattern is in a range of about 64°~76°.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 1:
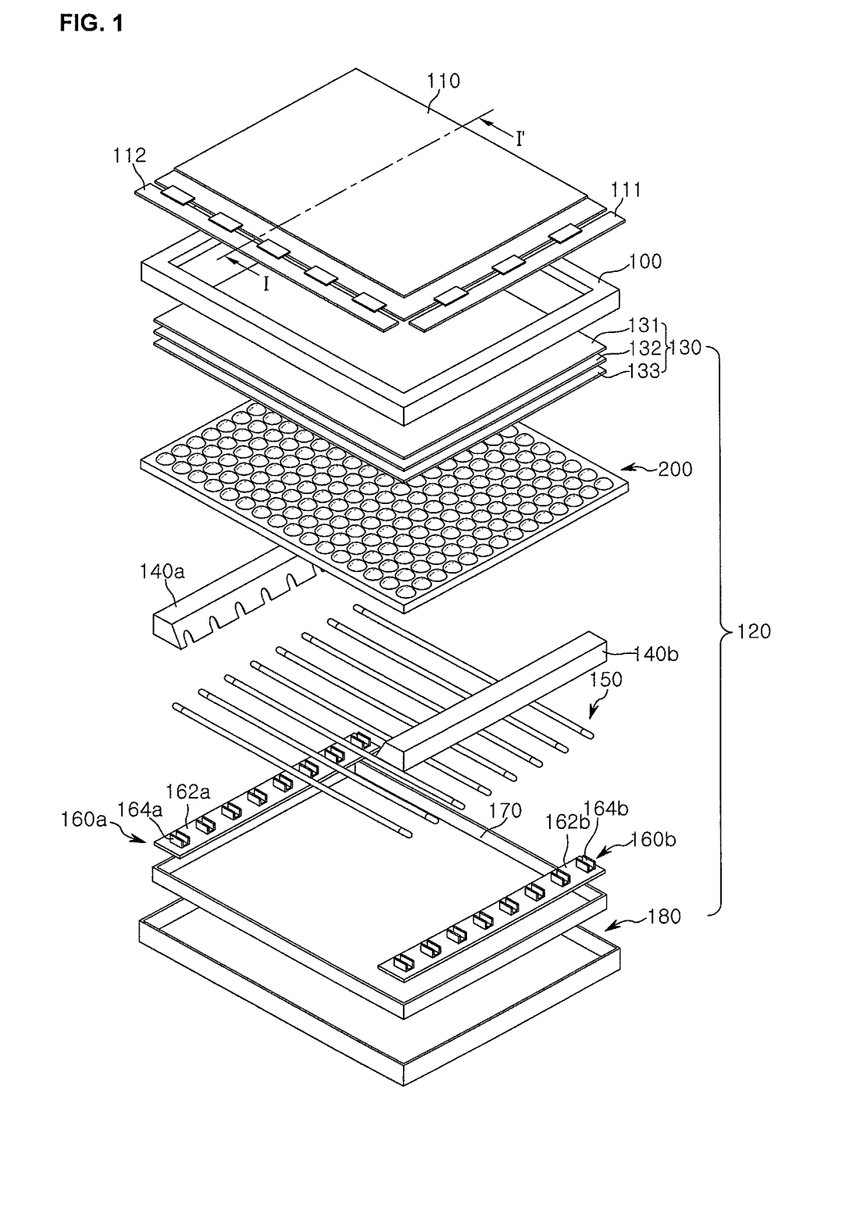
FIG. 1 is an exploded perspective view showing a direct type LCD device according to an embodiment of the present disclosure.
Figure 2:
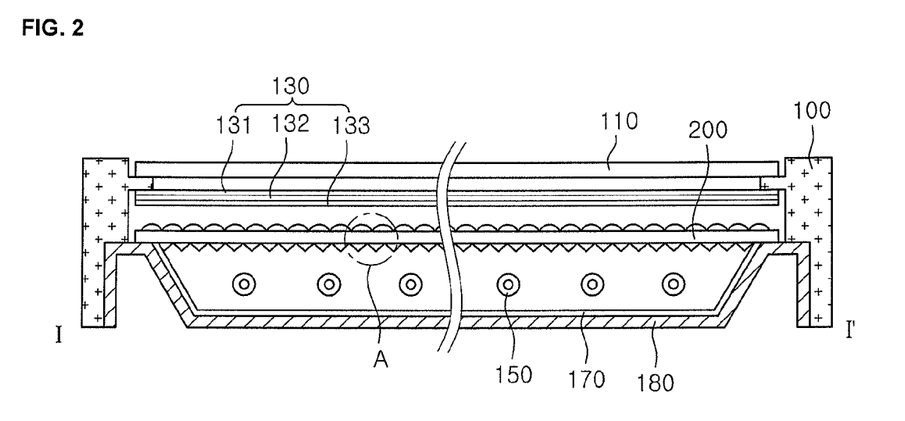
FIG. 2 is a cross-sectional view showing a direct type LCD device taken along line I-I' of FIG. 1.
Figure 3:
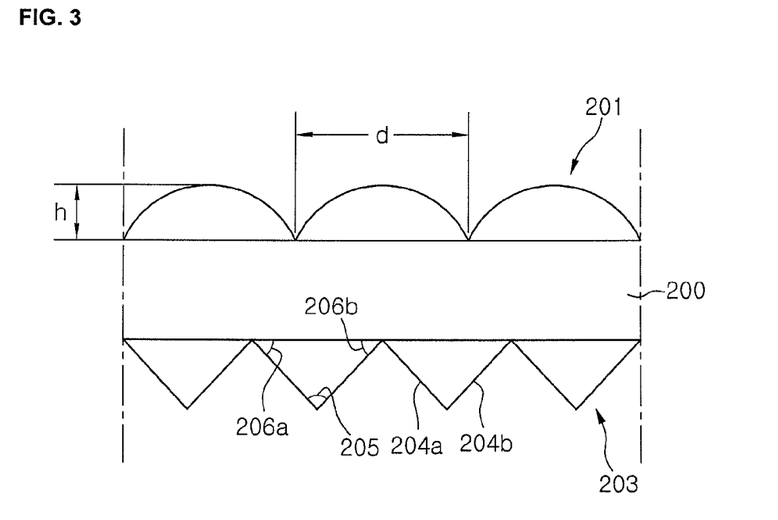
FIG. 3 is a cross-sectional view showing a diffusion plate direct in a portion A of FIG. 1.

FIG. 1 is an exploded perspective view showing a direct type LCD device according to an embodiment of the present disclosure. FIG. 2 is a cross-sectional view showing a direct type LCD device taken along line I-I' of FIG. 1. FIG. 3 is a cross-sectional view showing a diffusion plate direct in a portion A of FIG. 1.

Referring to FIGS. 1 to 3, an LCD device according to an embodiment of the present disclosure includes an LCD panel 110 configured to display an image, a panel guide 100 configured to support the edges of the rear surface of the LCD panel 110, and a backlight unit 120 disposed to irradiate light on the rear surface of the LCD panel 110.

The LCD panel 110 includes a thin film transistor substrate and a color filter substrate disposed opposite each other and combined to maintain a cell gap between them, as well as a liquid crystal layer interposed between the two substrates.

The LCD device further includes a gate driving portion 111 and a data driving portion 112 disposed on the edges of the LCD panel 110. The gate driving portion 111 and the data driving portion 112 generate driving signals which are used in driving the LCD panel 110.

A backlight unit according to an embodiment of the present disclosure will now be explained as a direct type which can be applied to a large-sized LCD device measuring at least 20 inches.

The backlight unit 120 includes a bottom cover 180 with an opened upper surface, a plurality of light sources 150 arranged at fixed intervals on the bottom cover 180, a diffusion plate 200 disposed over the plural light sources 150. The diffusion plate 200 is configured to first diffuse light. Also, the backlight 120 includes optical sheets 130 disposed on the diffusion plate 200, and a reflection sheet 170 disposed under the plurality of light sources 150. The optical sheets 130 are configured to include a diffusion sheet 133, a converging sheet 132, and a protective sheet 131 in order to converge and secondarily diffuse light. The reflection sheet 170 reflects light progressing downward from the light sources 150 toward the LCD panel 110.

The backlight unit 120 further includes first and second light source driving portions 160a and 160b disposed at both ends of the plurality of light sources 150. The first and second light source driving portions 160a and 160b apply a drive signal to the plurality of the light sources 150. To this end, the first light source driving portion 160a includes a first light source driving PCB (printed circuit board) 162a, as well as first sockets 164a arranged on the first light source driving PCB 162a and configured to contact one end of the plurality of light sources 150. Similarly, the second light source driving portion 160b includes a second light source driving PCB 162b and second grips 164b which are arranged on the second light source driving PCB 162b and engaged with the other ends of the plurality of light sources 150.

Also, the backlight unit 120 includes first and second support sides 140a and 140b disposed at both ends of the plurality of light sources 150. The first and second support sides 140a and 140b guide light emitted from the light sources 150 to the edges of the LCD panel 110 and support the diffusion plate 200 and the optical sheets 130. The light sources 150 include EEFLs (external electrode fluorescent lamps) which each have electrodes exposed at their ends, but the present embodiment is not limited to this. In other words, the light sources 150 can include CCFLs (cold cathode fluorescent lamps) or LEDs (light emission diodes).

The diffusion plate 200 first diffuses light and allows the diffused light to be progressed toward the optical sheets 130. To this end, the diffusion plate 200 can be formed from any one of PMMA (poly methyl methacrylate), PET (poly ethylene terephthlate), PC (polycarbonate), PS (poly styrene), and MS (stylrene-methyl methacrylate copolymer). Also, the diffusion plate 200 is configured to include micro-lens patterns 201 formed on its upper surface, and prism patterns 203 formed in an arranged direction of the light sources 150 on its lower (or rear) surface.

The micro-lens pattern 201 can be formed in the shape of a hemisphere. The prism patterns 203 are formed in shapes of lands which extend in the longitudinal direction of the light source 150 and protrude toward the light source 150 from the rear surface of the diffusion plate 200. In other words, the diffusion plate 200 is configured to have a rear surface on which a plurality of prism lands with a plurality of grooves are alternately arranged. Each of the prism patterns 203 is formed to have the cross-section of an isosceles triangle.

In this matter, the diffusion plate 200 is described in the configuration so that the micro-lens patterns 201 and the prism patterns 203 are formed on its upper and rear surfaces, but the present embodiment is not limited to this. For example, the prism patterns 203 and the micro-lens patterns 201 can be formed on the upper and rear surfaces of the diffusion plate 200, respectively.

The diffusion plate 200 configured to include the micro-lens patterns 201 and the prism patterns 203 on its upper and rear surfaces is not only to realize uniform high brightness, but also to implement slimness of the backlight unit 120. To this end, optimum specifications for the patterns will now be explained referring to the simulated data sheets of FIGS. 4 to 7.

Figure 4:
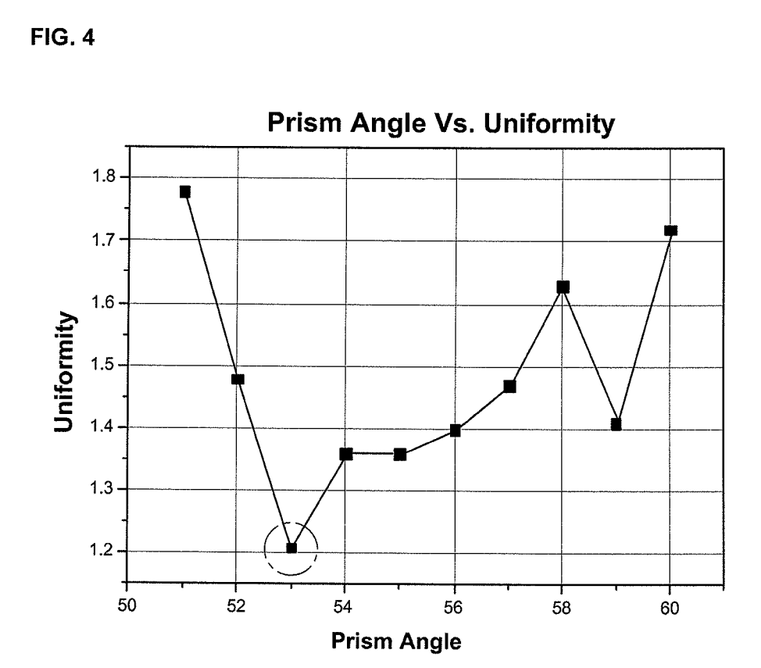
FIG. 4 is a simulated data sheet representing brightness uniformity for a base angle of a prism pattern according to an embodiment of the present disclosure.
Figure 5:
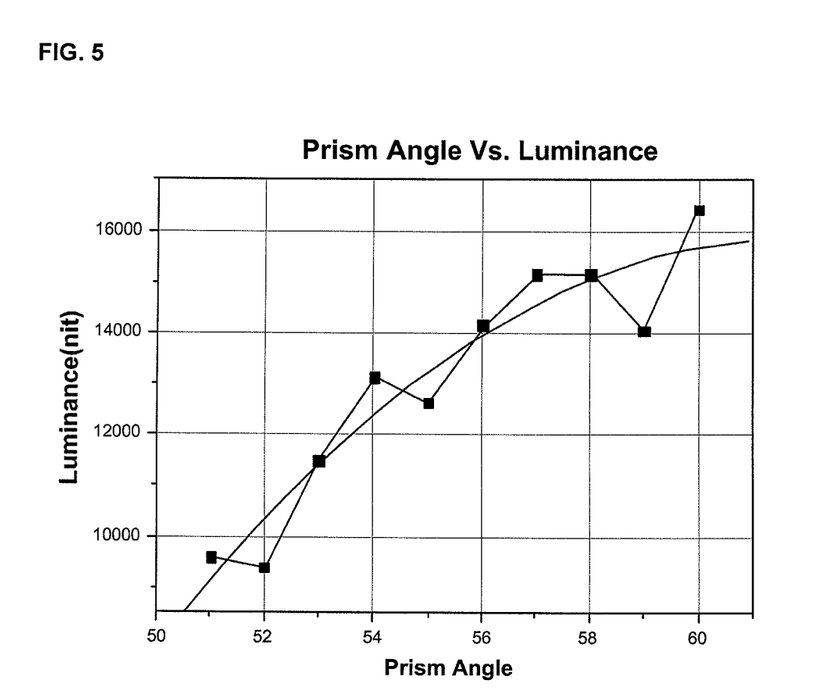
FIG. 5 is a simulated data sheet representing brightness for a base angle of a prism pattern according to an embodiment of the present disclosure.

FIG. 4 is a simulated data sheet representing brightness uniformity for a base angle of a prism pattern according to an embodiment of the present disclosure. FIG. 5 is a simulated data sheet representing brightness for a base angle of a prism pattern according to an embodiment of the present disclosure.

As shown in FIGS. 3 to 5, a diffusion plate 200 of the present embodiment is configured to include a plurality of prism patterns which each have two oblique surfaces 204a and 204b opposite to each other at a lower vertex angle 205. The two oblique surfaces 204a and 204b have the same length. As such, two base angles 206a and 206b formed by the oblique surfaces 204a and 204b and the rear surface of the diffusion plate 200 are the same. In other words, the prism pattern 203 is formed to have a cross-section of an isosceles triangle.

Actually, the prism pattern 203 can be formed to have a lower vertex angle of about 64°~76°. As such, the two base angles 206a and 206b of the prism pattern 203 become about 52°~58°.

The prism pattern 201 having the base angles 206a and 206b of 53° allows the most uniform brightness to be obtained. Also, the brightness is gradually enlarged according to the increment of the base angles 206a and 206b of the prism pattern 203. To rectify this, the base angles of the prism pattern can be designed at a range of about 52°~58°, thereby enabling the backlight unit to realize uniform high brightness as shown in the simulated data sheets. Consequently, the prism patterns on the rear surface of the diffusion plate 200 according to the present embodiment are formed to each have a lower vertex angle range of about 64°~76° and a base angle range of about 52°~58°, so that slimness of the backlight unit 120 is implemented and uniform high brightness is also realized.

Figure 6:
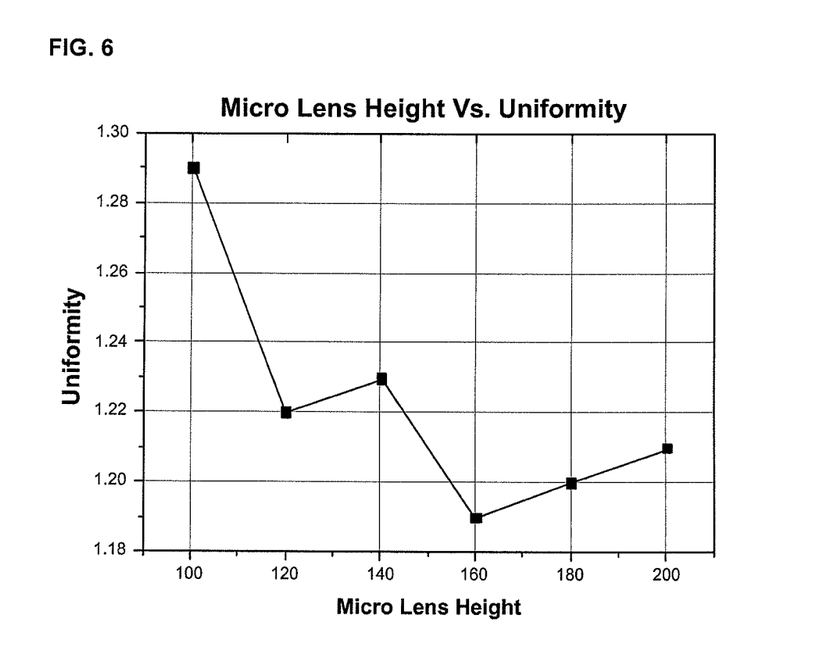
FIG. 6 is a simulated data sheet representing brightness uniformity for a base angle of a micro-lens pattern according to an embodiment of the present disclosure.
Figure 7:
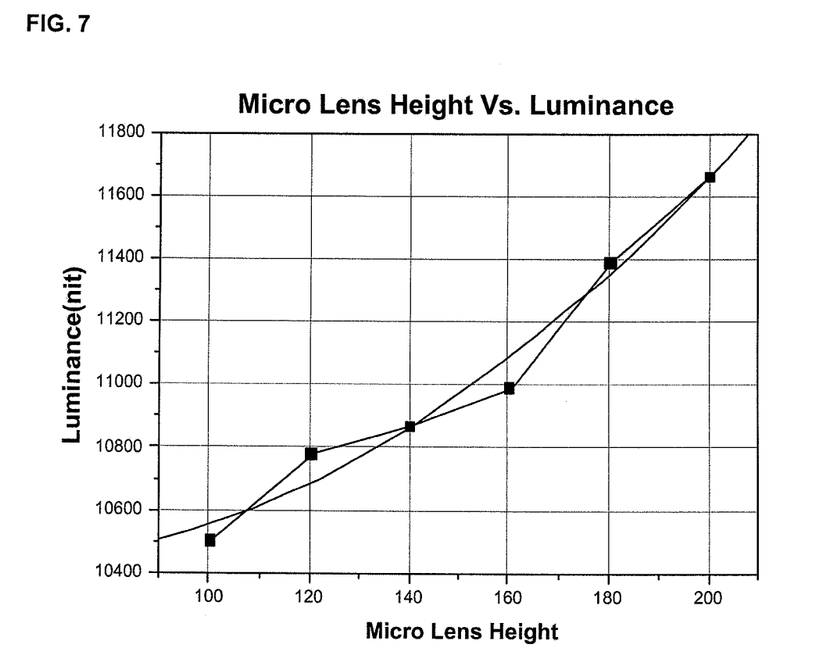
FIG. 7 is a simulated data sheet representing brightness for a base angle of a micro-lens pattern according to an embodiment of the present disclosure.

FIG. 6 is a simulated data sheet representing brightness uniformity for a base angle of a micro-lens pattern according to an embodiment of the present disclosure. FIG. 7 is a simulated data sheet representing brightness for a base angle of a micro-lens pattern according to an embodiment of the present disclosure.

As shown in FIGS. 3, 6, and 7, a diffusion plate 200 of the present embodiment is configured to further include a plurality of micro-lens patterns 201. Each of the micro-lens patterns has a height range of about 160 μm~200 μm. Also, the micro-lens pattern 201 has a range of about 2:1~5:2 in a ratio of diameter to height. If the micro-lens pattern 201 has a height of 160 μm, the diameter of the micro-lens pattern 201 can become about 360 μm~400 μm. Alternatively, when the micro-lens pattern 201 has a height of 200 μm, the diameter of the micro-lens pattern 201 can become about 400 μm~500 μm. To rectify this, the micro-lens pattern 201 can be formed in a diameter range of 360 μm~500 μm.

The micro-lens pattern 201 formed in the height of 160 μm allows the most uniform brightness to be obtained. Also, brightness is gradually enlarged according to the height increment of the micro-lens pattern 201. Consequently, the micro-lens patterns 201 on the upper surface of the diffusion plate 200 are formed in a height range of about 160 μm~200 μm as well as in a diameter range of diameter and height corresponding to about 2:1~5:2, in order to realize slimness of the backlight unit 120 and uniform high brightness.

As described above, the backlight unit according to an embodiment of present disclosure is configured to include the diffusion plate 200 which has the plurality of micro-lens patterns 201 on its upper surface and the plurality of prism patterns 203 on its rear surface. The prism patterns are formed to each have a lower vertex angle range of about 64°~76° and a base angle range of about 52°~58°. The micro-lens patterns 201 are formed in a height range of about 160 μm~200 μm as well as in a diameter range of diameter and height corresponding to about 2:1~5:2. Therefore, the micro-lens patterns 201 and the prism patterns 203 on the upper and rear surfaces of the diffusion plate 200 can be optimally formed. As a result, slimness of the backlight unit can be implemented, and uniform high brightness can be realized.

Also, the micro-lens patterns 201 included in the present embodiment are densely formed to occupy above 70% of the area of the diffusion plate 200. In other words, a fill factor of the micro-lens patterns 201 maintains above 70%. The fill factor means the occupying area of the micro-lens patterns 201. If the fill factor increases, the brightness of the backlight unit 120 becomes larger. When the micro-lens patterns 201 are formed in a hemispheric shape, empty spaces are generated between the micro-lens patterns 201. The micro-lens patterns 201 must be designed in a dense configuration, in order to minimize the empty spaces between the micro-lens patterns 201 and maintain the fill factor at above 70%.

Moreover, the prism patterns 203 included in the present embodiment must be formed so as not to round their lower vertex portion. If the lower vertex portion of the prism pattern 203 is rounded in the formation process, light is refracted at the rounded surface of the lower vertex portion, thereby deteriorating brightness and uniformity thereof. The prism patterns 203 must be designed to minimize the rounding of their lower vertex portion.

Figure 8:
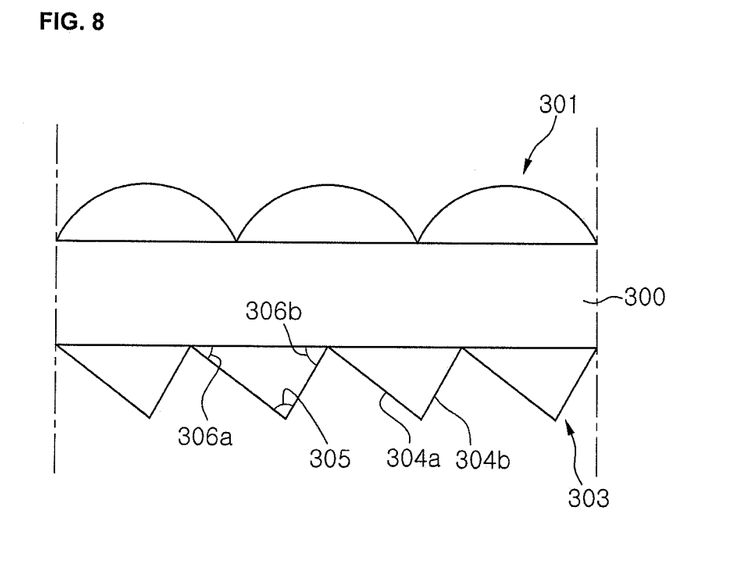
FIG. 8 is a cross-sectional view showing a diffusion plate according to another embodiment of the present disclosure.

FIG. 8 is a cross-sectional view showing a diffusion plate according to another embodiment of the present disclosure.

As shown in FIG. 8, a diffusion plate 300 according to another embodiment of the present disclosure is configured to include a plurality of micro-lens patterns 301 formed on its upper surface and a plurality of prism patterns 303 formed on its rear (or lower) surface.

Each of the prism patterns 303 has two oblique surfaces 304a and 304b opposite to each other at a lower vertex angle 305. The two oblique surfaces 304a and 304b have different lengths. As such, two base angles 306a and 306b between the oblique surfaces 304a and 304b and the rear surface of the diffusion plate 300 are different from each other. In other words, the prism patterns 303 are formed to have a cross-section of a non-isosceles triangle. The lower vertex angle of the prism pattern 303 is in a range of about 64°~76°.

On the other hand, the micro-lens patterns on the diffusion plate 300 of another embodiment have the same configuration and feature as those on the diffusion plate 200 of the previous embodiment. Accordingly, the detailed explanation of the micro-lens patterns 303 will be omitted.

In this way, the diffusion plate 300 according to another embodiment of present disclosure is configured to include the plurality of micro-lens patterns 301 formed in a height range of about 160 μm~200 μm and a diameter range of diameter and height corresponding to about 2:1~5:2 on its upper surface. It also includes a plurality of prism patterns 303 formed in a lower vertex angle range of about 64°~76° and different base angles on its rear surface. Therefore, slimness of the backlight unit can be implemented, and uniform high brightness can be realized.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. A backlight unit comprising:
a plurality of light sources arranged at fixed intervals;
a bottom cover having an opened upper surface and defining a receiving space;
a diffusion plate disposed over the plurality of light sources and including a flat bottom surface in contact with the opened upper surface of the bottom cover so that the diffusion plate and the bottom cover jointly enclose the plurality of light sources in the receiving space;
first and second light source driving portions disposed at both ends of the plurality of light sources, the first light source driving portion includes a first light source driving printed circuit board and first sockets, the first sockets is arranged on the first light source driving printed circuit board and configured to contact one end of the plurality of light sources, the second light source driving portion includes a second light source driving printed circuit board and second sockets, the second sockets is arranged on the second light source driving printed circuit board and configured to contact another end of the plurality of light sources;
a reflective sheet disposed on an inner surface of the bottom cover and in direct contact with the flat bottom surface of the diffusion plate;
prism patterns extending from the flat bottom surface of the diffusion plate toward the plurality of light sources, the flat bottom surface being in direct contact with the opened upper surface of the bottom cover such that the prism patterns are and enclosed in the receiving space of the bottom cover and the prism patterns are disposed in a position lower than the opened upper surface of the bottom cover, the prism patterns extending a first area on the diffusion plate; and micro-lens patterns formed on an upper surface of the diffusion plate, the micro-lens patterns extending a second area on the diffusion plate, the first area being smaller than the second area, wherein the vertex angle of each prism pattern is in a range of about 70°-76°, wherein the prism patterns are formed in shapes of lands which extend in longitudinal direction of the light source, wherein each of the prism patterns is formed to have a cross-section of an isosceles triangle including:

two oblique surfaces opposite to each other formed in the same length;

base angles between the oblique surfaces and the one surface of the diffusion plate being the same, wherein the base angle is in a range of about 52°~55°, wherein a fill factor of the micro-lens patterns maintains above 70%, wherein the fill factor means the occupying area of the micro-lens patterns, wherein each of the micro-lens patterns is formed in a height range of about 160 μm~200 μm, wherein each of the micro-lens patterns is formed in a ratio range of diameter and height corresponding to about 2:1~5:2, wherein the diameter of the micro-lens pattern is in a range of about 360 μm~500 μm, wherein the micro-lens patterns are formed in a hemispheric shape.

2. The backlight unit according to claim 1, wherein the micro-lens patterns are formed on a lower surface of the diffusion plate, and the prism patterns are formed on an upper surface of the diffusion plate.

3. A liquid crystal display device comprising:

a liquid crystal display panel;

a plurality of light sources arranged at fixed intervals under the liquid crystal display panel;

a bottom cover having an opened upper surface and defining a receiving space;

a diffusion plate disposed over the plurality of light sources and including a flat bottom surface in contact with the opened upper surface of the bottom cover so that the diffusion plate and the bottom cover jointly enclose the plurality of light sources in the receiving space;

first and second light source driving portions disposed at both ends of the plurality of light sources, the first light source driving portion includes a first light source driving printed circuit board and first sockets, the first sockets is arranged on the first light source driving printed circuit board and configured to contact one end of the plurality of light sources, the second light source driving portion includes a second light source driving printed circuit board and second sockets, the second sockets is arranged on the second light source driving printed circuit board and configured to contact another end of the plurality of light sources;

a reflective sheet disposed on an inner surface of the bottom cover and in direct contact with the flat bottom surface of the diffusion plate;

prism patterns extending from the flat bottom surface of the diffusion plate toward the plurality of light sources, the flat bottom surface being in direct contact with the opened upper surface of the bottom cover such that the prism patterns are and enclosed in the receiving space of the bottom cover and the prism patterns are disposed in a position lower than the opened upper surface of the bottom cover, the prism patterns extending a first area on the diffusion plate; and micro-lens patterns formed on an upper surface of the diffusion plate, the micro-lens patterns extending a second area on the diffusion plate, the first area being smaller than the second area, wherein the vertex angle of each prism pattern is in a range of about 70°~76°, wherein the prism patterns are formed in shapes of lands which extend in longitudinal direction of the light source, wherein each of the prism patterns is formed to have a cross-section of an isosceles triangle including:

two oblique surfaces opposite to each other formed in the same length;

base angles between the oblique surfaces and the one surface of the diffusion plate being the same, wherein the base angle is in a range of about 52°~55°, wherein a fill factor of the micro-lens patterns maintains above 70%, wherein the fill factor means the occupying area of the micro-lens patterns, wherein each of the micro-lens patterns is formed in a height range of about 160 μm~200 μm, wherein each of the micro-lens patterns is formed in a ratio range of diameter and height corresponding to about 2:1~5:2, wherein the diameter of the micro-lens pattern is in a range of about 360 μm 500 μm, wherein the micro-lens patterns are formed in a hemispheric shape.

* * * * *